UNITED STATES PATENT OFFICE.

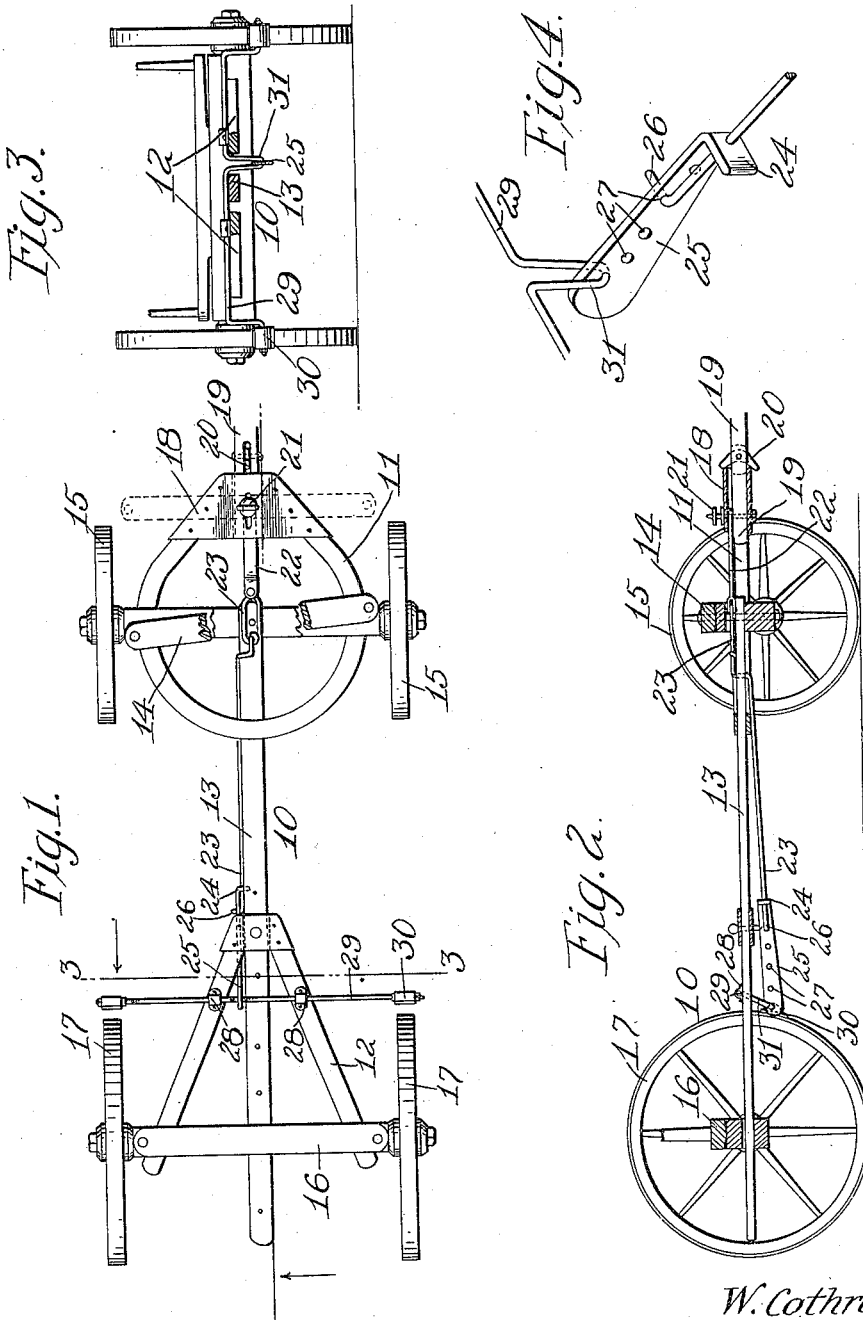

WILLIAM COTHRAN AND HENRY E. TANNER, OF BURLISON, TENNESSEE.

VEHICLE-BRAKE.

1,172,949. Specification of Letters Patent. Patented Feb. 22, 1916.

Application filed July 25, 1911. Serial No. 640,452.

*To all whom it may concern:*

Be it known that we, WILLIAM COTHRAN and HENRY E. TANNER, citizens of the United States, residing at Burlison, in the county of Tipton and State of Tennessee, have invented new and useful Improvements in Vehicle-Brakes, of which the following is a specification.

An object of the invention is to provide a brake for vehicles, which will be automatically actuated to apply the brake to the vehicle when the same is descending an incline.

For the purpose mentioned, use is made of a brake beam mounted to swing on the vehicle frame and provided with brake shoes adapted to engage the wheels of the vehicle, an operating rod connecting the brake beam with the tongue of the vehicle, the said tongue being slidably mounted on the running gear of the vehicle so that when the tongue is slid rearwardly the brake shoes will engage the wheels of the vehicle and means for adjusting the brake shoes relatively to the said tongue.

Reference is to be had to the accompanying drawings constituting a part of this specification, in which similar characters of reference denote corresponding parts in all the views, and in which—

Figure 1 is a plan view of the running gear of a vehicle, showing our device applied thereto, parts being broken away to disclose the underlying structure and the brake shoes being disengaged from the wheels of the vehicle. Fig. 2 is a vertical sectional view taken on the line 2—2 in Fig. 1, the brake being in operative position with the brake shoes in engagement with the wheels of the vehicle. Fig. 3 is a vertical transverse sectional view taken on the line 3—3 in Fig. 1, looking in the direction of the arrow. Fig. 4 is a fragmentary perspective view of the adjusting plate.

Referring more particularly to the views, we employ the usual vehicle running gear 10, consisting of front hounds 11 and rear hounds 12, connected by a coupling pole 13, a cross member 14 being mounted on the front hounds 11 and suitable wheels 15 being journaled on the running gear adjacent the cross member 14, a second cross member 16 being mounted on the hounds 12 with suitable wheels 17 journaled on the running gear 10 adjacent the cross member 16.

A slotted plate 18 is secured to the front hounds 11 and slidably mounted to operate therein is a tongue 19, the said tongue being provided with a stop lug 20 to limit the sliding movement of the tongue relatively to the hounds 11. Extended outwardly from the tongue 19 and projecting through the slot in the plate 18 is a pin 21 pivotally connected to a connecting rod 22 having its other end pivotally connected to an operating rod 23. The operating rod 23 extends rearwardly adjacent the coupling pole 13 and slidably extends through a lug 24 formed on an adjusting plate 25, the extreme end 26 of the operating rod 23 being bent laterally to pass through one of a series of apertures 27 in the adjusting plate 25 as shown more particularly in Fig. 4.

Mounted to swing on the rear hounds 12 by means of suitable journals 28 is a brake beam 29 having brake shoes 30 mounted on the ends thereof and adapted for engagement with the wheels 17, a brake beam 29, being provided with a crank portion 31 having pivotal engagement with the adjusting plate 25.

In the use of our device when the vehicle is on a level roadway, the brake shoes 30 will be spaced from the wheels 17 and when the vehicle descends an incline, the tongue 19 will slide rearwardly in the hounds 11, thus moving the operating rod 23, having connection with the tongue 19 and the operating rod 23 will in turn actuate the brake beam 29 to set the brakes 30, the mentioned operating rod being connected to the brake beam through the medium of the adjusting rod 25. Thus it will be seen that when the vehicle descends an incline the brakes will be automatically set and when the vehicle again operates over a level roadway the tongue will be pulled outwardly from the hounds 11 to reassume its normal position, thus disengaging the brakes 30 from the wheels 17.

By extending the end 26 of the operating rod 23 in different apertures 27 a relative adjustment can be easily and quickly obtained between the brake beam 29 and the tongue 19 as will be readily understood and although for the purpose of describing our device we have shown a particular construction thereof, it will be understood that the scope of the invention is defined in the appended claim.

Having thus fully described the invention, what we claim as new, is:—

A vehicle brake arrangement, consisting of a draft pole, a rear hound connected thereto and consisting of rearwardly divergent members, said rear hound having its inner convergent end disposed adjacent the rear wheels of a vehicle, bearings mounted upon the divergent arms, a shaft mounted in said bearings, a U-shaped crank formed integrally intermediate the end of said shaft and disposed snugly between said pole and one of said arms whereby to hold said shaft against longitudinal displacement, a perforated member engaging said U-shaped crank, an angular flange formed on said member, and disposed under said pole, an actuating rod passing through said lugs, a right angular pin formed on said rod engaging an opening in said member, a laterally deflected stem formed at the opposite end of said rod and projecting over upon said pole, and longitudinally movable means engaging said deflected portion adapted to operate said rod.

In testimony whereof we affix our signatures in presence of two witnesses.

WILL COTHRAN.
HENRY E. TANNER.

Witnesses:
T. J. PARKS,
CLARENCE FLEMING.

Copies of this patent may be obtained for five cents each, by addressing the "Commissioner of Patents, Washington, D. C."